Dec. 25, 1934.  H. L. BLUM  1,985,399
FLUID METER
Filed July 29, 1930    4 Sheets-Sheet 1

Inventor:
Homer L. Blum,
By Chas. M. Nissen,
Atty:-

Dec. 25, 1934.   H. L. BLUM   1,985,399
FLUID METER
Filed July 29, 1930    4 Sheets-Sheet 3

Inventor:-
Homer L. Blum,
By Chas. M. Nissen,
Atty:-

Dec. 25, 1934.  H. L. BLUM  1,985,399
FLUID METER
Filed July 29, 1930    4 Sheets-Sheet 4

Inventor:-
Hosmer L. Blum,
By Chas. M. Nissen,
Atty:-

Patented Dec. 25, 1934

1,985,399

UNITED STATES PATENT OFFICE 1,985,399

FLUID METER

Hosmer L. Blum, Fort Wayne, Ind., assignor to S. F. Bowser & Company, Inc., Fort Wayne, Ind., a corporation of Indiana Application July 29, 1930, Serial No. 471,553

21 Claims. (Cl. 73—30)

My invention relates in general to meters and has particular reference to that class of meters which are operated by the fluid which they measure and upon the passage of the fluid through the same.

One of the objects of my invention is the provision of improved and efficient means in a volumetric displacement meter for obtaining extremely accurate measurement under varying conditions.

A further object of the invention is the provision of an accurate volumetric displacement meter simplified in construction by the reduction of the number of moving parts.

Another object of the invention is the provision of improved controlling valve mechanism for a volumetric displacement meter.

A further object of the invention is the provision of improved mechanism for adjusting the volume measurement in a volumetric displacement meter.

Another object of the invention is the provision of passageways in a volumetric displacement meter for directing the flow downwardly to the bottom of the meter and thence upwardly to the outlet port to avoid separation of water from gasoline and the consequent tendency of freezing of the same at the bottom of the meter.

Another object of the invention is the provision of an improved and efficient volumetric displacement meter having the parts arranged for accessibility.

Other objects of the invention will appear hereinafter, the novel features and combinations being set forth in the appended claims.

In the accompanying drawings—

Figure 1:
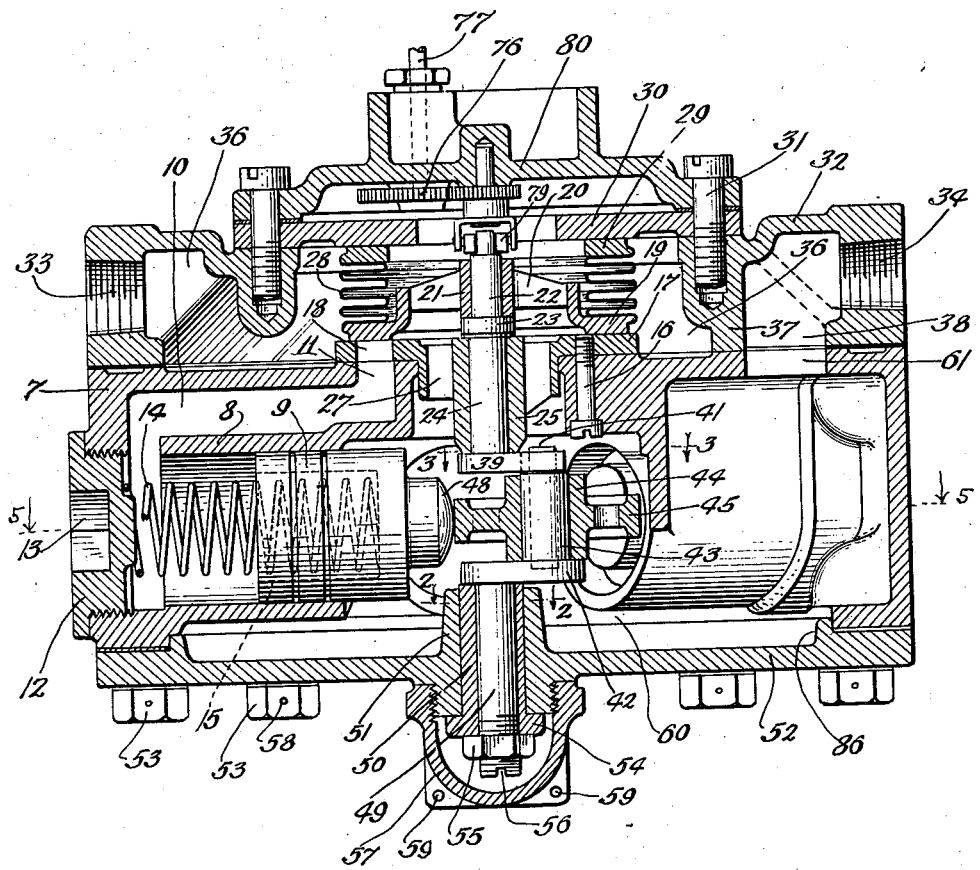
Fig. 1 shows a sectional elevation of a volumetric displacement meter embodying my improvements.
Figure 2:
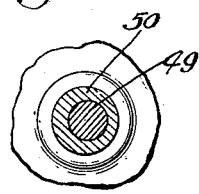
Fig. 2 is a sectional plan view on the line 2—2 of Fig. 1.
Figure 4:
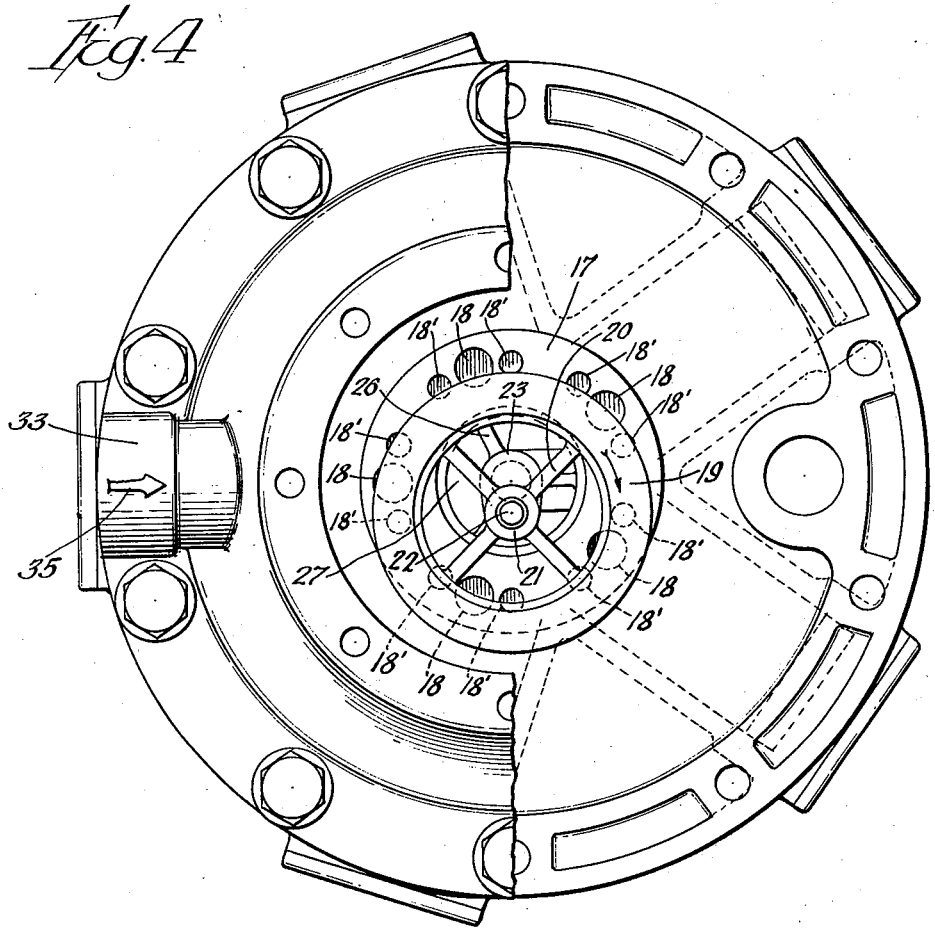
Fig. 4 is a plan view of the structure shown in Fig. 1, with a portion of the super-structure at the right broken away.
Figure 5:
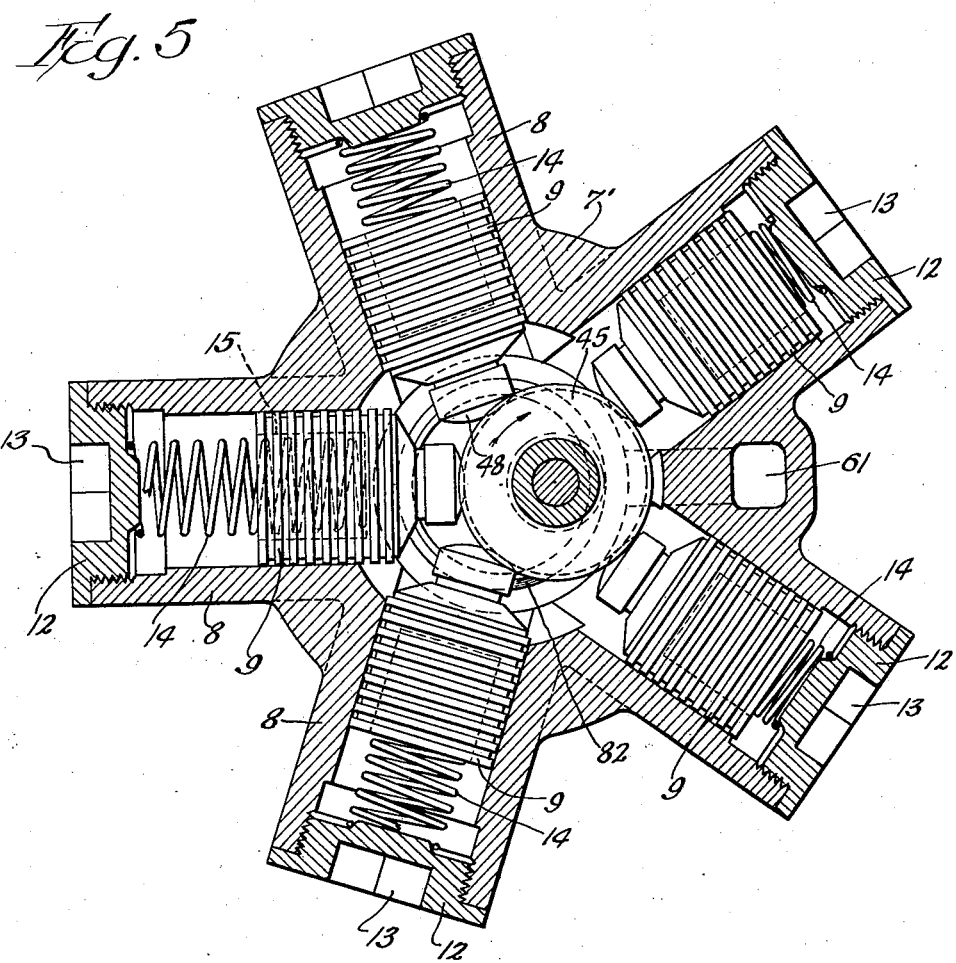
Fig. 5 is a sectional plan view taken on the line 5—5 of Fig. 1.

Referring to Fig. 1, 7 designates a casting which is shown in sectional plan view in Fig. 5. This casting comprises a plurality of radially arranged cylinders 8, 8. Although five of such cylinders are shown in Fig. 5, the number may be varied. In each cylinder is located a cylindrical piston 9 which may be grooved circumferentially to reduce friction. The outer ends of the cylinders 8 each communicate with a separate chamber or passageway 10 as shown in Fig. 1, each of which leads upwardly and inwardly to a plurality of ports 11 as shown in Figs. 1 and 4. It should be understood that there is a separate and independent passageway 10 leading from the rear end of each cylinder to a set of ports 11. That is to say, each passageway 10 is provided with its own set of ports 11, there being no direct communication between the passageway 10 for one cylinder and the passageway 10 of any other cylinder.

The outer ends of the cylinders 8 are closed by the cylinder heads 12 which may be screwthreaded into the ends of the cylinders 8 by means of a socket wrench inserted into the square recesses 13. Springs 14 may be located between the cylinder 12 and the bottom of the cylindrical recess 15 in each piston 9. Such springs may be applied to the pistons as shown to aid in the operation thereof as well as to maintain their heads in engagement with the circular cam as hereinafter described, but such springs may be omitted when the pistons are of sufficient length and are accurately guided in the cylinders.

Secured to the top of the casting 7 by means of cap screws illustrated at 16 in Fig. 1, is a port plate 17 having therein the ports 18. The ports may be grouped as shown in Fig. 4 by providing smaller ports 18', 18' at the sides of the larger ports 18. Each set of ports 18, 18' registers with the corresponding ports 11, and each set of ports 18, 18' communicates through the corresponding port 11 with the corresponding chamber 10. There is therefore one set of ports 18, 18' for each cylinder 8.

The upper surface of the port plate 17 constitutes an annular seat for the ring valve 19 which is connected by means of the spokes or spider frame 20 to the hub 21.

The hub 21 is journaled on the vertical shaft 22, the lower end of which is secured to the crank 23 at the upper end of the shaft 24 mounted in the bearing 25 in the center of the port plate 17. The journal bearing 25 is supported from the port plate 17 by means of the spaced radial webs or arms 26 so as to afford passageways 27 for the downward flow of the liquid through the center of the casting 7.

Secured to the top of the ring valve 19 is a bellows 28 of flexible material, preferably metal, of sufficient strength and resiliency to maintain the ring 29 seated against the bottom of the cover plate 30 which is secured by means of the cap screws 31 to the top of the cover casting 32 so as to close the upper opening in the same. The cover 32 is provided with an inlet port 33 for the meter and also with an outlet port 34 for the meter.

The liquid to be measured enters the inlet port 33 in the direction of the arrow 35 shown in Fig. 4 and may fill the chamber 36, but a partition 37 prevents this liquid from entering the chamber 38 which communicates with the outlet port 34.

Figure 3:
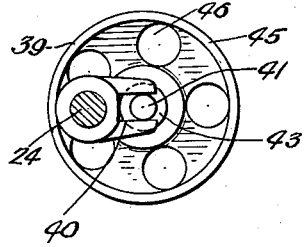
Fig. 3 is a sectional plan view of a portion of Fig. 1 taken on the line 3—3 thereof.

To the lower end of the shaft 24 is secured a crank 39 having a slot 40 fitting over a pin 41, the lower end of which is secured to a crank 42. Shrunk on the pin 41 or otherwise secured thereto, is a cylindrical sleeve 43 to serve as a bearing for the hub 44 of the circular cam 45. This cam is shown in disc form in Fig. 3 and may be provided with openings 46 so as to lighten the weight thereof. The peripheral surface may be cylindrical as shown in Fig. 1, or concave in cross-section as shown at 47 in Fig. 6.

The disc 45 is located in the horizontal plane of the axes of the cylinders 8 in position to be engaged by the convex heads 48 extending inwardly from the pistons 9. The peripheral surface of the disc cam 45 and the convex heads 48 of the pistons 9 are preferably of hardened material so as to reduce wear and enable greater accuracy in measurement to be maintained.

The crank 42 is secured to the depending shaft 49 mounted in the eccentric bushing bearing 50. The bushing 50 is mounted in the bearing 51 at the center of the bottom plate 52 which is removably secured to the casting 7 by means of the cap screws 53.

The lower end of the bushing 50 is provided with an annular flange 54 which is adapted to abut against the lower end of the bearing 51 as shown in Fig. 1.

The lower end of the shaft 49 is screw-threaded to receive the nut 55 for clamping the bushing 50 in adjusted position. When an adjustment is to be made the nut 55 is loosened and a screwdriver applied to the transverse slot 56 to turn the shaft 49 relatively to the bushing 50, or vice versa. It should be understood that when the nut 55 is tightened to secure the shaft 49 and shaft 50 in relative adjusted positions, the bushing 50 will constitute the shaft in the bearing 51 for the crank 42. It will thus be seen that the bearing 51 is in vertical alinement as to its axis with the bearing 25.

After the adjustment has been made as just described, the protecting cover cap 57 may be screwed to the bottom of the plate 52 and sealed thereto by means of the usual sealing means comprising a wire extending through the opening 58 in one of the nuts 53 and one of the openings 59 in the cover 57.

When the liquid to be measured enters the meter under pressure through the inlet port 33 into the chamber 36, it flows through the ports 18, 18' through the ports 11 and into the passageways 10 to the rear ends of the cylinders 8 as permitted by the ring valve 19. The convex heads 48 of the pistons 9 have a frictional engagement only with the periphery of the cam disc 45 and therefore the only effective action which the piston has on the disc 45 is a pushing action inwardly toward the vertical axis of the driven shaft 24. While the disc 45 acts as a roller because mounted for free rotation on the sleeve bearing 43, a resultant angular force is exerted nevertheless on the cranks 39 and 42 to rotate the shafts 24 and 49, 50. This will result in the rotation of the crank 23 and the rolling around of the valve 19 on its seat 17 while the ring 29 and bellows 28 cut off communication between the chamber 36 and the passageways 27 except through the ports 18, 18'.

By comparing Figs. 4 and 5 it will be seen that the ports at the left are about to close since the corresponding piston 9 at the left in Fig. 5 has completed its stroke. The uppermost ports in Fig. 4 are beginning to close since the corresponding piston shown at the upper left-hand side of Fig. 5 is about to finish its stroke. As the ring valve continues its clockwise rotation as shown in Fig. 4, the ports at the upper right-hand portion of Fig. 4 are about half open since the corresponding piston has just begun its stroke. The piston on the lower right-hand side of Fig. 5 has nearly completed its rearward stroke and therefore the port 18 on the inside of the ring valve 19 is about to close, but the port 18 for the lowermost piston shown in Fig. 5 is still being opened more widely because this particular piston has just begun its rearward stroke. In the positions assumed by the pistons in Fig. 5, the one at the left-hand side has just completed its inward stroke and is on dead-center. The two uppermost shown in Fig. 5 are acting to rotate the crank 39 and consequently the shaft 24. The lower piston extending toward the right is about to complete its rearward stroke and the lower piston extending toward the left is just beginning its rearward stroke. The arrangement of the ports 18, 18' and of the ring valve 19 in association therewith is such as to open these ports from the inlet 33 to the rear ends of the cylinders 8 when pressure is to be exerted by the convex heads 48 on the roller cam 45 and to connect these cylinders 8 to the interior of the valve 19 and to the passageways 27 when the pistons are to be retracted. For instance, in Fig. 5 the rear ends of the two upper cylinders are in communication with the port 33. The left-hand cylinder has just been cut off from the port 33 and is about to be connected to the passageways 27. The rear ends of the two lowermost cylinders are connected directly to the passageways 27.

It should be particularly noted that when the liquid enters the passageways 27 it flows downwardly through the central portion of the casting 7 to the chamber 60 above the bottom plate 52. The only egress from this chamber 60 is through the upwardly extending passageway 61 shown in Figs. 1 and 5. This passageway 61 communicates with the passageway 38 in the cover 32, which in turn communicates with the outlet port 34.

Figure 6:
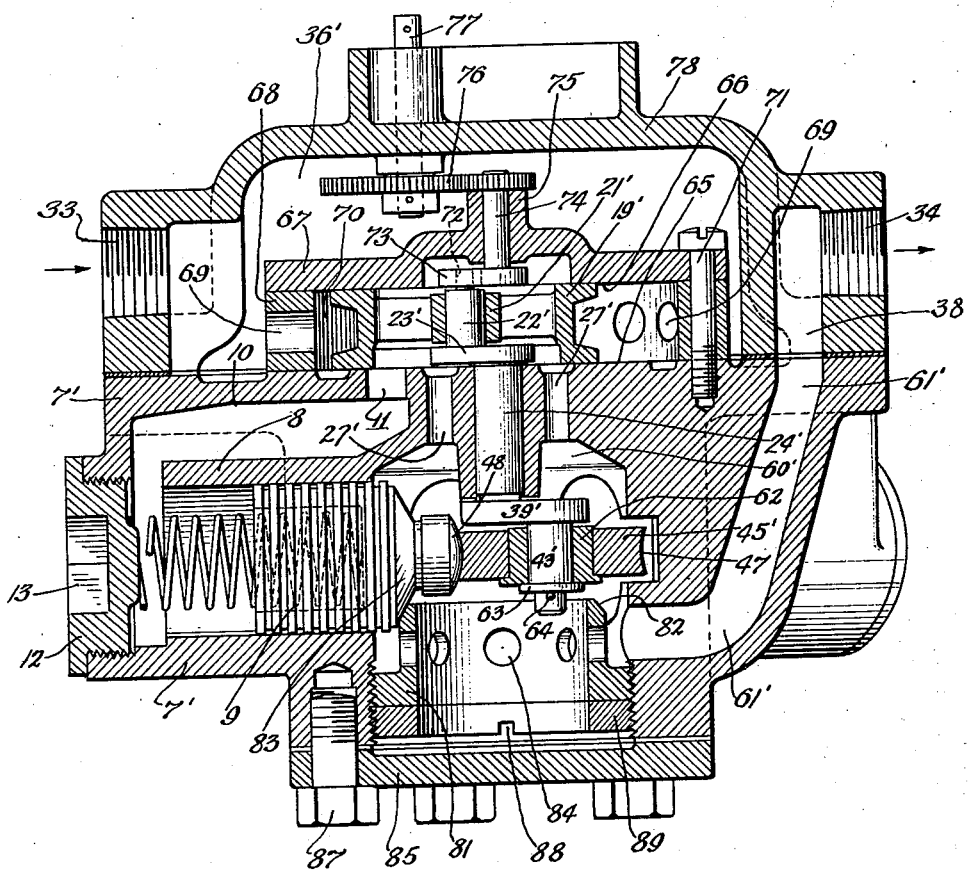
Fig. 6 is a sectional elevation similar to that shown in Fig. 1, but embodying a modification in the valve mechanism and a modification in the volume adjusting mechanism.

Fig. 6 shows a modification of the valve mechanism and wherein is provided means for adjusting the volume corresponding to each stroke of the pistons. The casting 7' is provided with cylinders 8 in a manner similar to the arrangement shown in Fig. 5. The passageways 10 lead through ports 11 to the inside or outside of the integral ring valve 19', the hub 21' of which is journaled on the shaft 22' secured at its lower end to the crank 23', which in turn is connected to the driving shaft 24'. The lower end of the shaft 24' is connected to the crank 39' which carries a depending bearing 43' on which is journaled the hub 62 of the roller cam 45'.

The hub 62 may be held in place by the washer 63 and the cotter pin 64.

It is clear by referring to Fig. 6 that the passageways 27' afford communication through the ring valve 19' between the ports 11 and the interior chamber 60' at the center of the casting 7'. The chamber 60' communicates with the passage 61' which leads from the bottom of the meter upwardly to the outlet port 34. It will thus be seen that in both Fig. 1 and in Fig. 6 provision is made for the flow of the liquid down to the bottom of the meter, and thence upwardly to the port 34. This is advantageous particularly in the metering of gasoline in cold weather because by directing the flow to the bottom of the meter water will not separate out from the gasoline and remain in the bottom of the meter where it is likely to freeze.

In the structure shown in Fig. 6, a valve seat is provided at 65 for the bottom of the ring valve 19' and the under surface 66 of the cover plate 67 serves as the upper seat for the upper side of the ring valve 19'. The valve seats 65 and 66 are held properly spaced apart by the ring 68 which is provided with radial ports 69 for free flow of the liquid from the chamber 36' into the chamber 70. The cover plate 67 may be held against the top of the ring 68 and the latter clamped against the top of the casting 7' by means of a plurality of cap screws, one of which is shown at 71 in Fig. 6.

When the shaft 24' in Fig. 6 is rotated and the crank 23' turned correspondingly, the pin 72 which projects upwardly from the shaft 22' slides in a slot in the crank 73 and operates the latter to rotate the vertical shaft 74 in the bearing 75 located in the top of the cover plate 67. Gearing 76 connects the shaft 74 to the shaft 77 journaled in the top of the cover 78. The shaft 77 is adapted to be connected to suitable counter-mechanism or means to register the amount of liquid passed through the meter.

In a similar manner, connection may be made as indicated at 79 in Fig. 1 between the shaft 22 and the gearing 76 to the vertical shaft 77 journaled in the cap plate 80 which may be secured to the top of the plate 30 by means of the cap screws 31.

In order to adjust the volumetric displacement in the structure shown in Fig. 6, I have provided a tubular abutment 81 which is screw-threaded into a lower opening in the casting 7'. The upper end of this abutment is provided with an annular beveled shoulder 82 in position to be engaged by the inner beveled annular shoulder 83 of each of the pistons which are radially arranged and the inner ends of which project into the chamber 60'. When the abutment is adjusted to a higher position the stroke of each piston will be shortened and when the abutment 81 is lowered the stroke of each piston will be lengthened. The number of rotations of the driving shaft and consequently the reading on the counter or registering mechanism will remain the same for a given number of reciprocations of the pistons, but by varying the displacement the meter may be adjusted to measure accurately the exact amount flowing through the meter.

The radial openings 84 in the tubular abutment 81 may be used to receive a suitable tool for adjustment of the position of the abutment 81. The openings 84 may also serve to facilitate the flow of the liquid into the passageway 61' and cause sufficient agitation of the liquid to prevent separation of the water therefrom if the liquid being measured is gasoline. However, by providing the removable bottom plate 85, sediment collected may be removed. In a similar manner, the upper surface of the bottom plate 52 of Fig. 1 may be pan-shaped as shown at 86 which may receive sediment so that the latter may be removed when the cap screws 53 are removed.

In the structure shown in Fig. 6, the botttom plate 85 is detachably secured to the casting 7' by means of the cap screws 87. When the plate 85 is removed, a turning tool may be inserted at 88 to loosen the ring lock nut 89, whereupon the abutment 82 may be adjusted in elevation and the ring nut 89 again tightened.

It should be particularly noted that in the structure shown in Figs. 1 and 6 there are no connecting rods between the inner ends of the pistons and the roller cam 45 or 45'. Therefore the removal of the cylinder heads 12 renders the pistons each readily accessible and removable for inspection and repair and replacements of piston rings if the latter are used. However, the number of moving parts subject to wear being greatly reduced, the meter will be reliable and accurate over a long period of time without repair or adjustment or replacement.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In a displacement meter, the combination with a plurality of radially arranged cylinders and pistons, of a shaft, a crank connected to said shaft and having a slot in its free end, a roller cam in position to be engaged by the inner ends of said pistons, a bearing for said cam, a crank connected to the lower end of said bearing, a projection from the upper end of said bearing into said slot, a shaft connected to said last-named crank, an eccentric bushing for said last-named shaft, a bearing for said bushing, and means for securing said shaft to said bushing in adjusted position to vary the axis of bodily rotation of said roller cam and the bearing therefor to effect adjustment of volumetric displacement.

2. In a displacement meter, the combination with a plurality of radially arranged displacement devices each comprising a piston having a beveled shoulder, of a driving shaft, means engaged by said pistons for operating said driving shaft, and a beveled abutment associated with said pistons and adjustable in position to be engaged by said beveled shoulders to vary the length of stroke of each piston and thereby adjust the volumetric displacement in the meter.

3. In a meter, the combination of a cylinder block provided with a central opening and provided with radially arranged cylinders, a shaft rotatably mounted at the central axis of said central opening, each of said cylinders having ports located adjacent one end of said opening, a valve eccentrically actuated by said shaft and adapted to co-operate with said ports to control the same, a piston in each cylinder, a roller eccentrically mounted on said shaft and adapted to contact with the inner end of each piston, said cylinder block having a liquid inlet adapted to communicate with the cylinder ports, there being a liquid outlet connecting with said central opening.

4. In a meter, the combination of means forming a group of associated cylinders symmetrically disposed about a central passage, each cylinder having a port symmetrically arranged about and around said passage, a rotatable shaft located at the central axis of said passage, there being a piston in each cylinder and connections from each piston to said shaft to rotate the same, and a plate spaced from that part of the cylinder wall having the ports therein and forming a liquid passage, said passage having an inlet, a valve eccentrically slidable on and relative to the ported walls of said cylinders, a ring associated with said plate, said ring and valve surrounding said central shaft, and a flexible tubular bellows of metal connected to said ring and to said valve, and means operated by said shaft for eccentrically shifting said valve.

5. In a meter, the combination of wall members forming a plurality of cylinders symmetrically arranged about a central opening providing a liquid passage, a rotatable shaft mounted centrally of said liquid passage, a piston in each cylinder, and connections from each piston to the shaft to rotate the same, each of said cylinder walls adjacent the central opening being provided with a port, a valve operatively associated with said shaft and slidable along the ported cylinder walls, means forming a liquid inlet for said ports, and means including an imperforate metallic bellows engaging a stationary wall portion and connected to said valve, said bellows being constructed and arranged to prevent the passage of liquid from said inlet directly to said central passage.

6. In a meter, the combination of means forming a plurality of radially disposed cylinders arranged about a transversely disposed central opening forming a liquid passage, each of said cylinders having a port, said ports being disposed symmetrically about said central passage, a cover casting associated with said cylinder walls and having an inlet and an outlet, a cover plate carried by said cover casting, said cover plate and casting having central openings registering with the central opening of said cylinder block, a cap plate carried by said cover casting and closing the opening of said cover plate and cover casting, a rotatable shaft mounted on said cap plate, a valve adapted to press against the ported walls of said cylinders and lying therebetween and said cover plate, connections from said central shaft to said valve, for eccentrically moving the valve, and connections from said central shaft to the shaft carried by said cap plate.

7. In a meter, the combination of a block providing a central fluid chamber and radially extending cylinders, a piston in each cylinder, a rotatable shaft mounted at the common center of said cylinders with the inner end of said shaft projecting into said fluid chamber, means operatively associated with each piston and said shaft to rotate the same, each of said cylinders being provided with a port, there being also a port for the central chamber, a ported ring resting on said cylinder block and surrounding said ports, a cap plate resting on said ring, means for holding and securing said cap plate and said ring to the cylinder block, a cover detachably secured to said block and closing said ring and cap plate and providing a fluid chamber provided with an inlet, an independently located outlet, said cylinder block being provided with a discharge outlet from a central chamber to said outlet, a valve slidable in said cylinder block and operatively associated with said ports, said valve slidably pressing against said cylinder block and said cap plate, said valve having a bearing carrying a shaft, crank connections from said last named shaft to the first mentioned shaft, said cap plate carrying a third shaft, crank connections from said second mentioned shaft to said third shaft, a fourth shaft carried by said cover, and geared connections from said third shaft to said fourth shaft.

8. In a meter, the combination with a cylinder block provided with a central liquid chamber and a plurality of cylinders radiating therefrom, means forming a bearing extending centrally of said liquid chamber and from said cylinders, a central shaft mounted in said bearing and having a crank, a roller eccentrically mounted on said crank, a piston in each cylinder and each of said pistons having free contact with said roller, each of said cylinders having a port, and the walls of the block adjacent the central shaft and adjacent said ports being provided with an inlet port, a cover casting mounted on said cylinder block and spaced therefrom to form a liquid inlet chamber and an isolated outlet chamber, said cylinder block having a passage from the central passage to said outlet chamber, said cover casting having a central opening co-axial with said first mentioned shaft, a cover plate provided with a central opening about the axis of said first mentioned shaft and carried by said cover casting, a cap plate detachably mounted on said cover casting and having a central bearing in line with the axis of the first mentioned shaft, said cap plate closing the assembly, a grid-like valve associated with the ports of said cylinder walls, the central portion of the grid of said valve having a bearing, a shaft in said bearing, and crank connections from the first mentioned shaft to said second mentioned shaft, a third shaft carried by the cap plate, operative connections from said second mentioned shaft to said third mentioned shaft, a ring plate pressing against the inside surface of the cover plate, and a flexible metallic bellows connecting the ring plate with the grid valve.

9. In a meter, the combination with a cylinder block provided on one side and centrally thereof with an inwardly projecting sleeve and an oppositely disposed central opening, cylinders radiating from said central opening, a piston in each cylinder, a valve seat mechanism mounted in said central opening and provided with an inwardly projecting central sleeve carrying a shaft having a crank on its inner end, an eccentric sleeve mounted in said first mentioned sleeve and carrying a shaft provided with a second crank, a third shaft connecting said cranks, a roller rotatably mounted on said third shaft and having constant contact with the inner ends of said free pistons, valve mechanism operated by said first shaft, the outer end of said second shaft being threaded, a nut thereon engaging the eccentric sleeve, the outer end of said second shaft having means for turning the same, and a closure cap threadedly engaging the cylinder block and enclosing the ends of said eccentric sleeve and said shaft.

10. In a meter, the combination with a cylinder block having a central opening on one side and an oppositely disposed central and inwardly depending sleeve, the cylinder block adjacent said sleeve being formed with inner ports located centrally of the block, said block having cylinders radiating from said central opening, a free piston having a bevelled shoulder in each cylinder, each of said cylinders having a port located adjacent the openings at said central sleeve, a shaft in said central sleeve and having a crank on its inner end and a second shaft on said crank, a roller revolubly mounted on said second mentioned shaft and in position to engage the inner ends of said free pistons, valve mechanism associated with said ports and having connection with said first mentioned shaft to be operated thereby, said cylinder block between said radiating cylinders forming a liquid chamber adapted to communicate with a discharge passage, the walls of said first mentioned central opening being threaded, a sleeve adjustably mounted therein and provided with an inner bevelled surface adapted to form an adjustable stop to engage bevelled shoulders on each piston, said sleeve having at its inner end ports adapted to register with said discharge port, a lock ring in said first mentioned opening behind said sleeve, the outer portion of said ring having means thereon for turning the same, and a cap plate detachably mounted on said cylinder block and closing said opening.

11. In a meter, the combination with a cylinder block having a central opening on one side and an oppositely disposed central and inwardly depending sleeve, the cylinder block adjacent said sleeve being formed with inner ports located centrally of the block, said block having cylinders radiating from said central opening, a free piston in each cylinder, each of said cylinders having a port located adjacent the openings at said central sleeve, a shaft in said central sleeve and having a crank on its inner end and a second shaft on said crank, a roller revolubly mounted on said second mentioned shaft, and in position to engage the inner ends of said free pistons, valve mechanism associated with said ports and having connection with said first mentioned shaft to be operated thereby, said cylinder block between said radiating cylinders forming a liquid chamber adapted to communicate with a discharge passage, the walls of said first mentioned central opening being threaded, a sleeve adjustably mounted therein and adapted to form an adjustable stop to engage each piston.

12. In a meter, the combination of a cylinder block provided with a central opening and provided with radially arranged cylinders, a shaft rotatably mounted at the central axis of said central opening, each of said cylinders having ports located adjacent one end of said opening, a valve actuated by the shaft and cooperatively associated with said ports to control the same, a free piston in each cylinder, means normally urging each piston resiliently toward the shaft and means operatively associated between the pistons and the shaft for rotating the shaft in response to piston movement, said cylinder block having a liquid inlet adapted to communicate with the cylinder ports, there being a liquid outlet connecting with said central opening.

13. In a meter, the combination of a cylinder block provided with a central opening and provided with radially arranged cylinders, a shaft rotatably mounted at the central axis of said central opening, each of said cylinders having ports located adjacent one end of said opening, a valve eccentrically actuated by said shaft and adapted to cooperate with said ports to control the same, a free piston in each cylinder, a roller eccentrically mounted on said shaft and adapted to contact with the inner end of each piston, said cylinder block having a liquid inlet adapted to communicate with the cylinder ports, there being a liquid outlet connecting with said central opening, and adjustable means for limiting the movement of the pistons toward the shaft.

14. In a meter having a shaft adapted for operative connection to registering mechanism, the combination of a plurality of cylinders radially arranged about the said shaft, a piston in each of said cylinders, a cam eccentrically mounted on said shaft rotatable freely therein and adapted for contact about its periphery with the inner ends of all of said pistons, and means to adjustably limit the stroke of the pistons toward the cam.

15. In a volumetric displacement meter, the combination with a plurality of radially arranged cylinders and co-operating fluid pressure pistons, of a shaft, a crank connected to said shaft, and a disc connected to said crank in position to have its periphery operatively engaged by said pistons to effect rotation of said shaft, and means to limit the movement of the pistons toward the shaft.

16. In a meter having a shaft adapted for operative connection to registering mechanism, the combination of a plurality of cylinders circularly arranged about the said shaft, a piston in each of said cylinders, a cam mounted on said shaft and adapted for contact about its periphery with the ends of all of said pistons, and means to adjustably limit the stroke of the pistons in relation to the cam.

17. In a displacement meter, the combination with a drive shaft, of a plurality of radially extending fluid pressure cylinders, each having a piston movable radially with respect to the shaft, means forming an operative connection between each piston and the drive shaft, and valve mechanism, including a flexible metallic tube co-operatively associated with and actuated by said shaft for controlling the flow of fluid to said pistons, and yielding means normally urging said pistons toward said shaft.

18. A meter for liquid comprising a casing having a plurality of radially arranged measuring cylinders, the longitudinal axes of said cylinders being coplanar, and ported passages leading from the cylinders to a source of liquid supply and to a discharge, pistons disposed in said cylinders, a shaft for a registering device actuated by movement of said pistons for indicating the volume of liquid displaced by the pistons in said cylinders, a valve controlling the flow of liquid in said passages to and from said cylinders, said valve being disposed between the plane of the cylinder axes and said registering shaft and movable in an orbital path in a plane parallel with said plane of the cylinder axes, means operatively connecting said pistons for effecting correlated movement thereof, and means connecting said valve and said last named means whereby the valve is subjected to orbital sliding movement in response to movement of said pistons, the means last mentioned permitting said valve to rotate freely about its own axis in its flow-controlling movement.

19. A meter for liquids comprising a casing having radial cylinders arranged with their axes in a common plane, pistons in said cylinders, means connecting said pistons for correlated movement, a registering shaft, means rotated by movement of said pistons for rotating said shaft, a valve rotatable about its own axis and movable in an orbital path by said pistons in a plane parallel to the plane of the cylinder axes and located between said plane and said registering shaft, said casing having a valve contacting face with annularly disposed ports therein leading to said cylinders, said ports being controlled by the valve, and inlet passageway adapted to communicate with said ports when said ports are uncovered by movement of the valve, and an exhaust passageway in said casing face, said valve having a passageway formed therethrough which passageway is positioned by movement of the valve to connect said ports with the exhaust passageway.

20. A liquid meter comprising a casing, a plurality of cylinders radially disposed within said casing with their longitudinal axes arranged in a common plane, pistons operable within said cylinders and connected for correlated movement, a shaft centrally disposed within said casing on an axis perpendicular to said cylinder axes plane operable by said pistons, a register shaft, a valve movable in an orbital path, means for operating said register shaft and said valve with said central shaft, said valve being mounted for free rotation about its own axis and being disposed between the register shaft and the plane of the cylinder axes, a liquid inlet leading to said casing and a liquid outlet leading therefrom, and passageways within said casing communicating said cylinders with the inlet and outlet, said valve being arranged to control said passageways in its orbital movement.

21. A liquid meter comprising a casing, a plurality of cylinders radially disposed within said casing with their longitudinal axes arranged in a common plane, pistons operable within said cylinders and connected for correlated movement, a shaft centrally disposed within said casing on an axis perpendicular to said cylinder axes plane operable by said pistons, a register shaft, a valve movable in an orbital path, means for operating said register shaft and said valve with said central shaft, said valve being mounted for free rotation about its own axis and being disposed between the register shaft and the plane of the cylinder axes, a face in said casing parallel to the plane of the cylinder axes along which said valve is movable, circumferentially disposed ports leading through said face to the outer ends of the cylinders, a centrally disposed port in said face through which said central shaft passes, a liquid outlet in said casing communicating with said central port, and a liquid inlet to said casing, said valve being adapted in its orbital movement to alternately connect a cylinder port with said inlet and then with said central port.

HOSMER L. BLUM.